United States Patent [19]

Krusche et al.

[11] 4,076,090
[45] Feb. 28, 1978

[54] DRIVE AND STEERING ARRANGEMENT FOR A VEHICLE WITH DIFFERENTIAL-SPEED STEERING

[75] Inventors: Alfred Krusche, Grossostheim; Hans Dieter Drahtmüller, Obernau, both of Germany

[73] Assignee: Linde Aktiengesellschaft, Wiesbaden, Germany

[21] Appl. No.: 666,214

[22] Filed: Mar. 12, 1976

[30] Foreign Application Priority Data

Mar. 14, 1975 Germany .............................. 2511176

[51] Int. Cl.² .............................................. B62D 11/04
[52] U.S. Cl. .............................. 180/6.48; 74/471 XY
[58] Field of Search .............................. 180/6.48, 6.2; 74/471 XY; 60/420, 421, 487, 489; 137/636.2; 200/6 A; 188/83

[56] References Cited

U.S. PATENT DOCUMENTS

| | | | |
|---|---|---|---|
| 2,745,506 | 5/1956 | McCallum | 137/636.2 X |
| 3,095,754 | 7/1963 | Mayon | 74/471 XY |
| 3,496,796 | 2/1970 | Alpers | 74/471 XY |
| 3,672,161 | 6/1972 | Krusche | 180/6.48 X |
| 3,677,362 | 7/1972 | Chatterjea | 180/6.48 |
| 3,744,335 | 7/1973 | Gustaukarlsson | 74/471 XY |
| 3,954,146 | 5/1976 | Smemo | 180/77 R |

Primary Examiner—Robert R. Song
Assistant Examiner—R. Schrecengost
Attorney, Agent, or Firm—Karl F. Ross

[57] ABSTRACT

A vehicle, especially a tracked vehicle, which is turned by imparting a speed differential to the drive wheels on opposite sides of the vehicle, is provided with a control member or lever which cooperates with four control-pressure transmitters. The transmitters are oriented symmetrically with respect to the manually operated member so that in its neutral position all four of the control pressure transmitters are ineffective. Each of two opposite control-pressure transmitters are connected with one side each of the respective servomotors controlling hydrostatic transmissions for the wheels. The other two transmitters are each connected to the opposite sides of the servomotors.

16 Claims, 5 Drawing Figures

FIG. 4
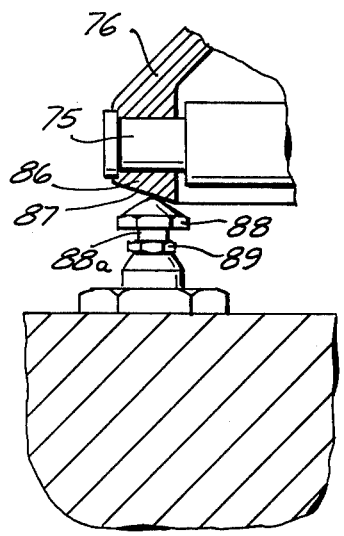
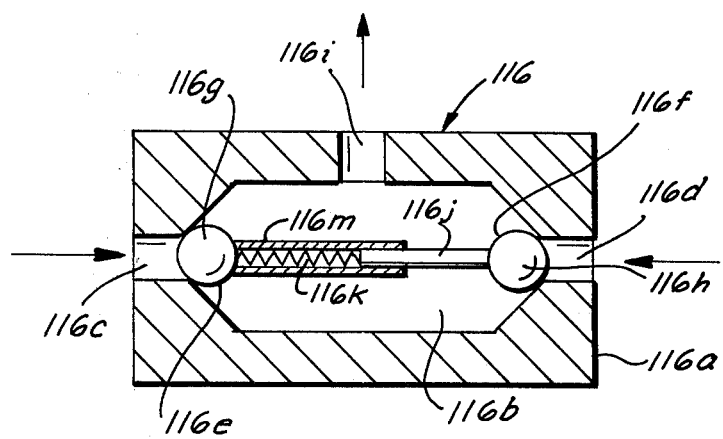
FIG. 5

DRIVE AND STEERING ARRANGEMENT FOR A VEHICLE WITH DIFFERENTIAL-SPEED STEERING

FIELD OF THE INVENTION

The present invention relates to steerable vehicles and, more particularly, to vehicles which are steered by differential rotation of drive members on opposite sides of the vehicle. More especially, the invention deals with improvements in hydrostatically driven vehicles in which each side (left and right) has at least one drive member whose speed is controlled by the position of a control element of the hydrostatic drive.

BACKGROUND OF THE INVENTION

Differential-speed steering vehicles have been provided heretofore and are of a primary interest in the tracked-vehicle, tractor, military vehicle and construction vehicle class. In general they comprise a drive wheel on each side of the vehicle (left and right sides) and respective motors for operating these wheels.

The particular class of vehicle with which the instant invention is concerned are those which are driven by a hydraulic drive, e.g. a hydrostatic transmission associated with each wheel. Such drive arrangement may comprise a shiftable element, e.g. a tiltable control plate or cylinder drum or the pump or motor or both of a hydrostatic transmission. Of course, a common pump may serve a pair of hydrostatic motors each connected with one of the drive wheels. In this case just the hydrostatic motor can have a tiltable member for controlling the driven wheel. In any event each of the driving wheels of the vehicle is associated with a hydrostatic transmission having a displaceable control element which varies the direction of rotation of the wheel and the speed thereof. The vehicle is generally provided with a prime mover such as an internal combustion engine, which can drive the pump or pumps. This control element may be operated by a servomotor (servofollower).

It is known in connection with such vehicles to provide a control lever which serves to select the direction of movement of the vehicle. For example, when the control lever or member is tilted forwardly the vehicle is expected to move forwardly with the lateral wheel being driven at the same speed. When the lever is drawn rearwardly, the drive wheels are reversed and the vehicle moves backward. When the lever is tilted to one side or the other, the driven wheels on opposite sides of the vehicle are rotated at different speeds and the vehicle is caused to turn in one direction or another. Since the wheels of the vehicle are operated at different speeds for turning, the steering system is considered a differential speed steering.

In the prior-art systems, the steering control comprises four control-pressure transmitters mounted on the vehicle in pairs equidistant from the control lever on opposite sides of the longitudinal median plane through the vehicle. Thus two transmitters lay in each of two planes equispeced from but parallel to the longitudinal median planes of the vehicle. All four parallel pressure transmitters are equispaced from the actuating lever so that each of the transmitters is actuated to the same extent for a given angular displacement of the lever in the appropriate direction.

When it is desired to drive the vehicle forwardly, the lever is swung in a plane parallel to the vehicle longitudinal median plane or in this plane itself in a forward direction.

The lever thus operates both of the forwardly disposed transmitters to the same extent. Because the two actuated control pressure transmitters have the same spring characteristics and valve characteristics, the servomotors connected to the hydrostatic drives for the wheels are displaced identically and in the same direction. The vehicle moves recitilinearly forward.

A corresponding response results when the lever is swung in the longitudinal median plane of the vehicle rearwardly from its neutral position. In this case the two rearwardly disposed transmitters are actuated identically and shift the servomotors of the hydrostatic drives in the opposite directions to the same degree so that a rectilinear reverse movement is brought about.

When the vhicle is to travel along a curve, the actuating lever is not displaced in the longitudinal median plane of the vehicle but rather is tilted at an angle thereto so that the lever is swung in a vertical plane which is inclined to the longitudinal median plane. The parallel pressure transmitters on one side thus become more effective than those on the other side. Of course when the plane in which the lever is swung is perpendicular to the longitudinal median plane through the pivot point of the lever, the vehicle rotates in place.

The conventional system thus provides a multiplicity of control conditions under the control of a single lever. For example straight forward, straight back, right hand curve forward, right hand curve back, left hand curve forward, left hand curve back, rotation in place and each with a substantially continuous range of speeds.

However, the system has the disadvantage that in the transition from curvilinear travel forwardly to curvilinear travel rearwardly the lever must be swung from one side of the controller to the other. Similarly when the sense of curvature is to be changed, the lever must be swung from one side to the other. As a consequence, successive operating conditions arise which require spontaneous and immediate reversal of the position of the lever from one extreme to the other and such movements are unnatural. In addition, there is a hiatus in the movement of the vehicle or the operation of servomechanisms of the hydrostatic transmission which can lead to failure. Furthermore in such transitions it is not possible to immediately position lever accurately in a new position which provides the desired direction and speed.

It has been found, especially in chain-driven vehicles (tracked vehicles), that even when the control lever is held still at transitions between left and right curves, the vehicle oscillates or swishtails (see German Gebrauchsmuster No. 77 16 968).

OBJECTS OF THE INVENTION

It is an object of the invention to provide an improved differential speed steering control system which will obviate the aforementioned disadvantages.

Another object of the invention is to provide an improved system for controlling tracked vehicles whereby swishtailing can be eliminated.

Still another object of the invention is to provide a steering control system, especially for a tracked vehicle, where the transition curves in opposite senses and between forward and rearward movements can be accomplished by the operator with greater ease, less danger of breakdown and smooth motion.

It is another object of the invention to provide a control system of the character described which permits more rapid transistions between curvilinear travel directions.

It is also an object of the invention to enable a clear-cut distinction to be maintained between curvature travel, small radius and rotation in place for a differential speed drive.

Another object of the invention resides in the provision of a simpler but yet safer control arrangement for differentially steered vehicles.

SUMMARY OF THE INVENTION

These objects and others which will become apparent hereinafter are attained, in accordance with the present invention, in a differential-speed steering arrangement for a vehicle, generally a chain or track vehicle, in which the driving wheels on each side of the vehicle are provided with respective hydrostatic transmissions whose servomechanisms are displaceable by respective control pressures. Four control-pressure transmitters are provided for actuation by a common control lever in whose neutral position all four control-pressure transmitters are unaffected (ineffective) and wherein the four control-pressure transmitters are disposed symmetrically about the control lever.

The invention is characterized in that from each of two opposite control-pressure transmitters hydraulic lines extend to respective pressurizable compartments on one side each of the respective servomotor pistons to apply the same pressure thereto, while both of the two other control-pressure transmitters are connected to pressure compartments on the opposite side of each of the servomotor pistons of the hydrostatic transmissions.

Preferably each of the first-mentioned control-pressure transmitters is actuated by a displacement of the control lever in a direction parallel to the longitudinal median plane of the vehicle while the two second control-pressure transmitters are each actuated by a swinging of the control lever in a respective direction perpendicular to the longitudinal median plane of the vehicle. For the purposes of the present description, a displacement of the control lever in a direction parallel to the longitudinal median plane of the vehicle will be represented as a displacement in the $x$ direction ($x$ displacement) while a displacement perpendicular or transverse to this plane will be described as a displacement in the $y$ direction ($y$ displacement).

Each of the control-pressure conduits from each of the control-pressure transmitter is, in accordance with a preferred feature of the invention, branched into two control-pressure lines and each of the branches of the control-pressure transmitters which are actuated by displacement in the $x$ direction is connected to the servomotor of a respective one of the two hydrostatic transmissions on opposite sides of the vehicle. The other branch line from each of these two control-pressure transmitters is fed to a changeover valve together with respective branch lines from the control-pressure transmitters actuated by displacement of the control lever in the $x$ direction.

Consequently, each of the control-pressure transmitters (first control-pressure transmitters) aligned in a plane parallel to the longitudinal median plane of the vehicle or lying in this plane, is connected via branch lines to the servomotors of the hydrostatic transmissions on each side of the vehicle. Each of the branch lines from the frist control-pressure transmitters is connected to the opposing hydrostatic transmissions.

Consequently, for rectilinear travel forwardly or rearwardly, only a single control-pressure transmitter is actuated by the control member to deliver the same control pressure to both of the hydrostatic transmissions on opposite sides of the vehicle to cause the wheels thereof to operate in the same sense and at the same speed.

Since a single control-pressure transmitter operates both servomotors for forward or reverse rectilinear speed, as opposed to the prior-art arrangement in which two control-pressure transmitters with possibly different characteristics regulated the forward and reverse speeds, the vehicle will not deviate from its rectilinear (straight-line) motion.

Furthermore, for curvilinear travel, only one control-pressure transmitter apart from the respective first control-pressure transmitter (i.e. only one control-pressure transmitter out of a plane parallel to the longitudinal median plane) is actuated. A lateral displacement of the control member generates a well-defined differential speed between the hydrostatic transmissions on opposite sides of the vehicle and only a forward or reverse movement so that even the smallest curve radii can be taken with ease.

It is important for the present invention that the steering movement is not affected by blocking the control pressure but by building a counterpressure on the opposite side of a servomechanism piston of the servomotor. This allows the control-pressure transmitter to have other forms than the usual pressure-reducing valve and even permits the control-ressure transmitter to be of an electrohydraulic type. For example, four potentiometers can be provided for operation by the control member, each of which may operate a respective electrohydraulic valve for accomplishing the effect described above. Two of these potentiometers can lie in the longitudinal median plane of the vehicle or in a plane parallel thereto, while two other potentiometers are spaced apart in a direction perpendicular to the longitudinal plane.

Of course the potentiometers can act directly upon the servomotors or hydrostatic transmission control elements on each side of the vehicle, if desired.

According to another feature of the invention, each of the hydrostatic transmissions comprises a variable-displacement pump as well as a variable-displacement motor having a spring-loaded servomechanism piston.

From each of the changeover valves, the output duct may be branched so that each of the two branches is connected to a further changeover valve whose output side is connected to a compartment of the servomotor lying opposite the spring-biased side of the latter.

Still another feature of the invention resides in providing the two ducts which supply the pressurizable compartments of the servomotors of the pumps of the hydrostatic transmission which must be pressurized for forward travel with an actuatable four-port, two-position (4/2) distributing valve (auxiliary valve).

This arrangement has been found to provide a precise separation between curvilinear travel with small radius, for example for the chain of a vehicle, and enables rotation of the vehicle about a central axis, thereof.

The vehicle is thus driven about its main vertical axis when an additional (auxiliary) valve is selectively actuated. The system also eliminates dangerous conditions which might otherwise arise.

This additional valve can be an electromagnetic valve which is energized by a special pushbutton and this pushbutton can be provided upon the control member so that the vehicle can be fully controlled by a single hand of the operator.

The control member can be rotatable about its own axis in its support which may be provided with a microswitch engageable by a rotating portion of the control member. The control member may be held in a normal position against rotation about its axis by springs and by rotation either left or right from this normal position can actuate the additional valve through the microswitch. Of course, in this case the operator must take care not to inadvertently rotate the control member during a forward or reverse steering motion by inadvertent gripping of the control lever too tightly to the extent that rotation of the control lever may occur.

The arrangement described above in which additional changeover valves are provided has been found to be particularly desirable when the hydrostatic transmissions of the vehicles include variable-stroke pumps as well as variable-stroke motors.

To avoid undesirable movements of the control member in the prior-art systems, it has already been proposed to provide stiff-spring arrangements to make any displacement of the control member more difficult or to provide indexing means whereby the displacement of the control member must take place to predetermined indexed positions.

These proposals have never been found to be fully satisfactory and it has now been discovered that the problem can be avoided simply by making the restoring forces of the plungers of the control-pressure transmitters displaced to either side of the longitudinal plane greater than the restoring forces of the control-pressure transmitters in this plane. This can be done by making the plungers of these second transmitters act against stiffer springs or by preloading the springs of these plungers to a greater extent than the springs of the plungers of the control-pressure transmitters in the longitudinal plane. The result also my be accomplished by providing additional prestressed springs which come into play when the control member is displaced laterally to either side of its longitudinal median plane.

The stiffening of the springs of the control-pressure transmitters as set forth above can be performed with ease in the system of the present invention since each control-pressure transmitter to opposite sides of the longitudinal plane is actuated only when the control member is swung in the respective position.

It is also possible to provide each of the control-pressure transmitters or preferably only the two control-pressure transmitters disposed to opposite sides of the median plane, with a spring against which the control member acts having a discontinuous characteristic, i.e. a spring characteristic having a bend or break therein. Thus with slight steering movements of the control lever (corresponding to slight displacements from the vertical position) a very fine steering control is provided, while with sharper displacements of the control member a greater change in the control pressure is brought about for each degree of further displacement of the control member. The result is an especially precise steering operation.

It has also been found to be advantageous to enable the control member to be displaced through relatively small angular movements from its neutral position without affecting the control-pressure transmitters. To this end the control member is provided with an actuating plate which is adapted to bear upon the plungers of the control-pressure transmitters. Between this plate and the plungers, there is provided an adjustable play or lost motion.

We have also found that it is advantageous to provide the control member and its control-pressure transmitters in a particularly advantageous configuration for best results in accomplishing the objects set forth above.

More particularly, the control-pressure transmitters are provided in a common housing in equispaced relationship about the support for the control member which is disposed centrally of the four control-pressure transmitters.

Means is provided for swingably mounting the control member for movement about a pivot axis parallel to the direction of vehicle travel in a longitudinal plane extending in the $x$ direction. A rocker is swingable about this axis and defines a second pivot axis about which the control member and the plate adapted to bear upon the plungers of the control-pressure transmitters is pivotal. A brake plate is mounted on the rocker and is engaged by brake members or a single brake member (shoe) which acts against it under the control of spring pressure. The brake shoe can be provided upon the plunger-actuating member cf plate.

The actuating portion of the control member can be an annular element whose conical or toroidal configuration on its underside cooperates with the four plungers. However, each of the plungers can be provided with an independent pressure plate carried by the control member and mounted on the actuating portion. The latter configuration is lighter in weight while the former is more readily manufactured.

The brake device formed from the brake plate and the brake shoe enables the control member to be retained in either a forward-drive or rearward-drive position even when it is released by the operator. Of course the brake force must be greater than the restoring force applied by the control-pressure transmitters to the control member. The vehicle then travels with the set speed forwardly or rearwardly, rectilinearly. However, a lateral displacement of the control member is not retained because the brake device is only effective upon the rocker and not upon the pivotal movement of the control member about the axis defined thereby. The restoring forces of the control-pressure transmitters to either side of the longitudinal plane thus serve to restore the control member to its neutral position when the latter is released.

In order to ensure that the control member is restored to its original position for bringing the vehicle to standstill against the brake force, we provide an indexing device. According to the invention the indexing device can be provided in the form of an indexing recess in an upper portion of the brake plate while an indexing member is mounted with spring loading upon the actuating element of the control member for engagement in this recess when the control member is returned to its neutral position from a forward or rearward displacement.

The differential steering system of the present invention provides an accurate and precise drive of the vehicle. When the control member is shifted in the forward direction or the rearward direction in the longitudinal plane, the vehicle is operated with the corresponding speed, up to maximum, in the respective direction. With a displacement of the control member to either side of this plane, the maximum speed can be retained and the vehicle turn in the respective direction at the preset speed. When the control member is swung to either side through more than 45° out of the longitudinal plane, the vehicle is permitted to swing about one track at elevated speed until the lever is brought to a 90° position out of the plane at which time the minimum turning speed is reached. Rotation about the main axis is effected only through actuation of the additional valve. Thus the latter rotation in place is permitted only when the operator intends such rotation by actuating the valve, e.g. through a special pushbutton provided for this purpose. The condition is maintained as long as the pushbutton is depressed and hence as long as the auxiliary valve is energized.

Brief Description of the Drawing

The above and other objects, features and advantages of the present invention will become more readily apparent from the following description, reference being made to the accompanying drawing in which:

FIG. 4 is a detail of a modification thereof; and

FIG. 5 is a section through a changeover valve for use in the system of FIG. 1.

SPECIFIC DESCRIPTION

Figure 1:
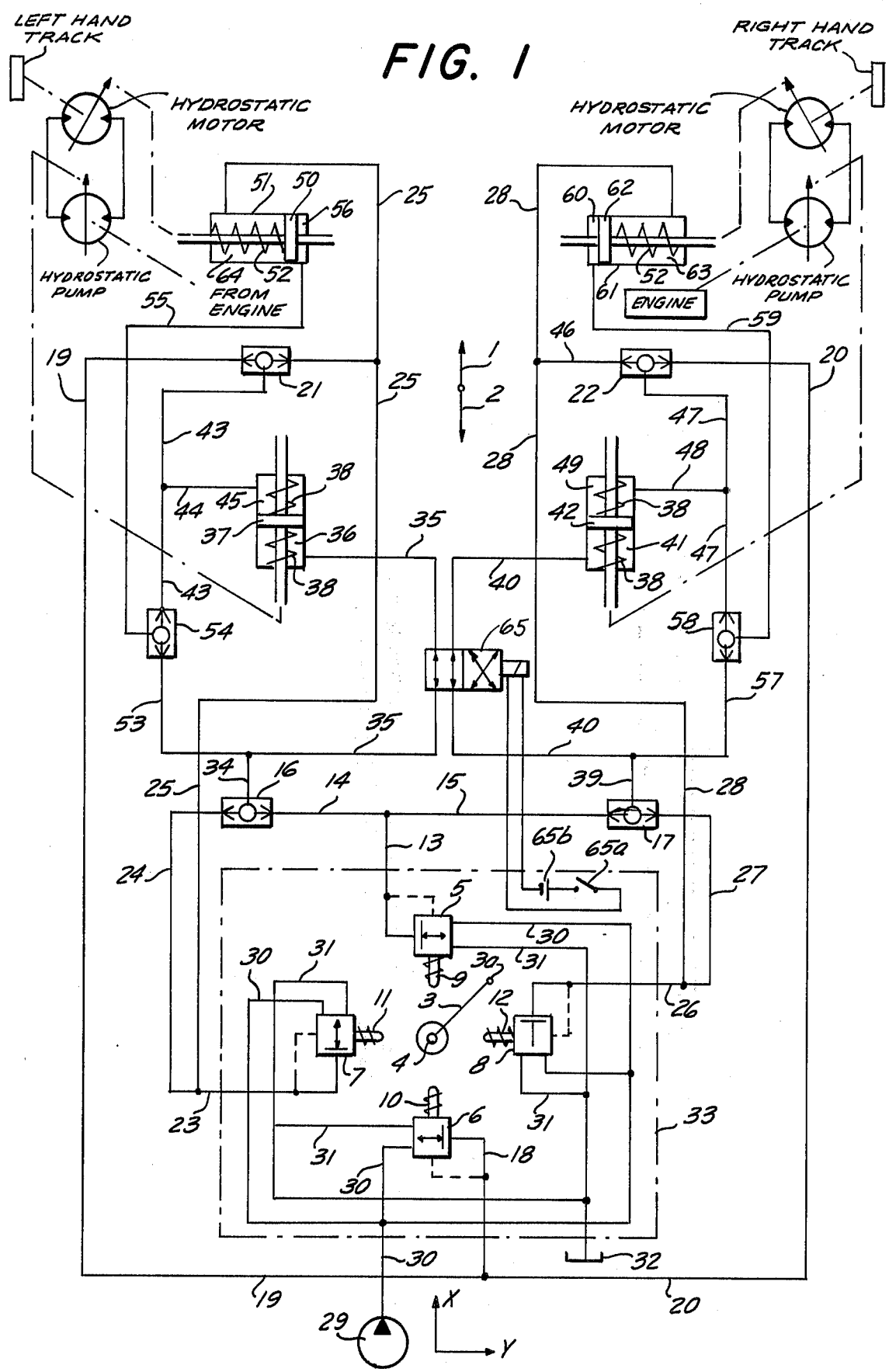
FIG. 1 is a flow diagram of the hydraulic system according to the invention.

In FIG. 1 we have represented by $x$ a vertical longitudinal plane of the vehicle containing the axis of a control member 3. This plane may be the longitudinal median plane of the vehicle, e.g. a tracked vehicle, or a plane parallel thereto.

The arrow $y$ then represents a plane perpendicular to the $x$ plane. Although this $y$ plane is represented at a location offset from the axis of the control member 3, it will be understood that it is an axial plane of the control member as well. Furthermore, when $x$ and $y$ are referred to as directions herein, they represent the forward-rearward directions and lateral (right-left) directions respectively.

During curvlinear travel of the vehicle, resulting from the application of different speeds to the tracks or drive wheels on opposite sides thereof, the center of curvature of the paths will lie in plane $y$. Reference numeral 1 respresents an arrow indicating the forward-travel direction while arrow 2 indicates the rearward-travel direction.

Figure 2:
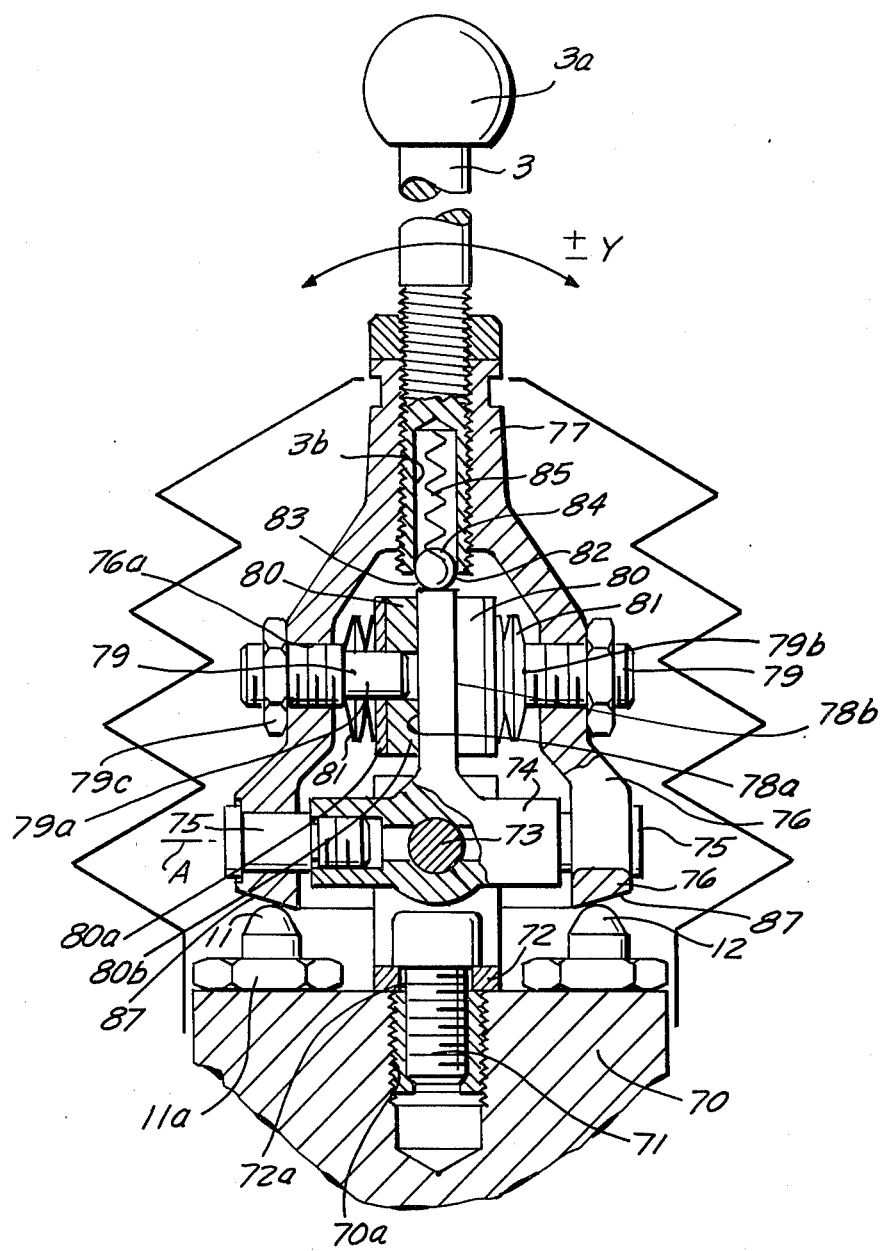
FIGS. 2 and 3 are mutually perpendicular side cross-sectional views through the control arrangement for the steering system of the invention.
Figure 3:
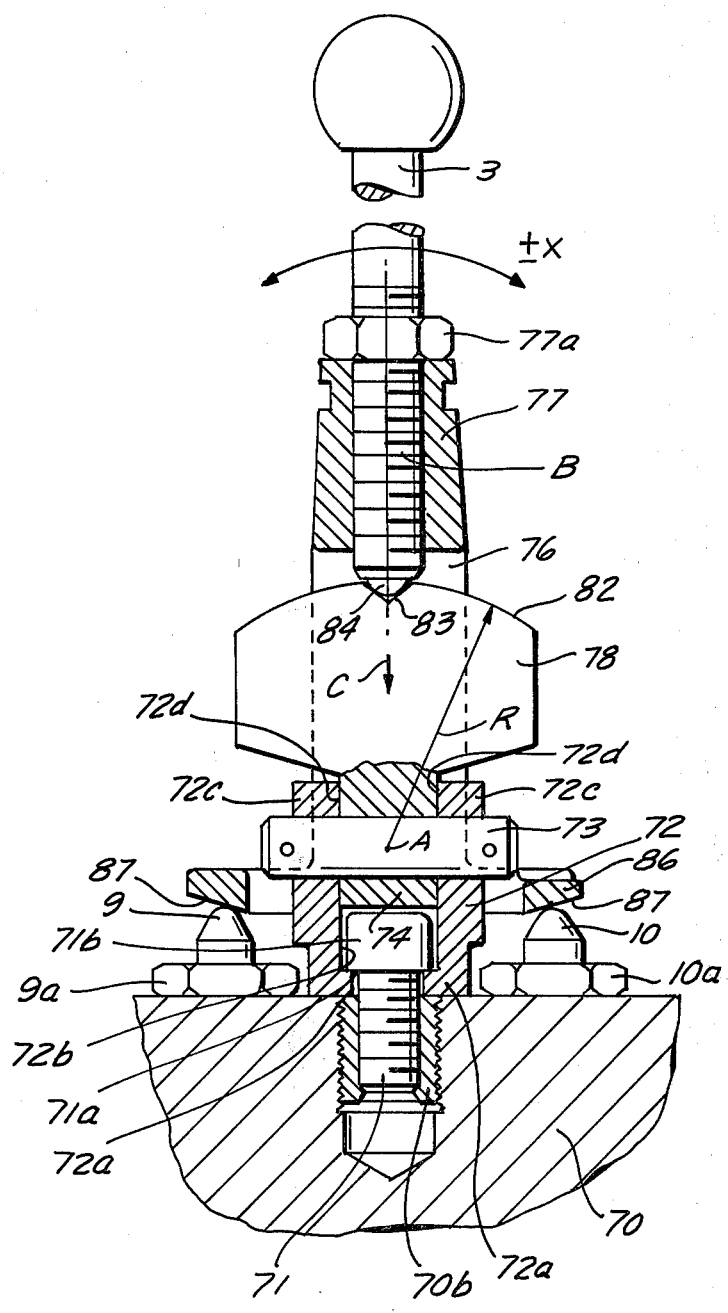

The control (speed-and-direction selecting) member or lever 3 is shown to be swingably mounted on the vehicle about a vertical axis, lying in planes $x$ and $y$ at the intersection thereof, by a universal joint (Cardan joint) 4 better seen in FIGS. 2-4. The control member 3 is positioned to actuate four plungers 9, 10, 11, 12 respectively operating four control-pressure transmitters 5, 6, 7, 8. The control-pressure transmitters 5, 6, 7, 8 are radially equispaced from the joint 4 and are angularly equally spaced around it.

The control-pressure transmitters 5 and 6 lie respectively fore and aft of the joint 4 in the longitudinal plane $x$ while the transmitters 7 and 8 lie respectively to the left and to the right of this plane in the transverse plane $y$ perpendicular to plane $x$ and passing through the point 4.

From the control-pressure transmitter 5 a line 13 extends to a junction with a pair of branch lines 14 and 15. Branch line 14 runs to a first changeover valve 16 and branch line 15 runs to a second changeover valve 17.

The changeover valves 16 and 17, like all of the changeover valves described herein (see FIG. 5), comprise check valves which permit fluid flow from either of two input lines depending upon which of these lines has the higher pressure, the flow being to a single output line. In other words, for the changeover valve 16, when line 14 delivers the higher pressure, input from line 24 is blocked and fluid will flow from line 14 to line 34. Alternatively, when the pressure in line 24 exceeds that in line 14, the inlet from line 14 is blocked and fluid will flow under pressure from line 24 to the output line 34. Each of the changeover valves described hereinbelow operates similarly.

As can be seen from FIG. 5, each of the changeover valves 116 can comprise a housing 116a formed with a chamber 116b into which inlets 116c and 116d open at opposite ends. Each inlet is formed with a seat 116e, 116f engageable by a ball 116g and 116h which is carried on a stem 116i, 116j. The stems are telescopingly connected and urged apart by a light spring 116k. The outlet of the valve is shown at 116m.

When the pressure at inlet 116c is greater than that at 116d, the ball 116g is pushed back from its seat to permit flow of fluid from inlet 116c to outlet 116m. When the pressure at inlet 116d is, however, higher the ball 116h is moved aside and the pressure within the compartment is that of the higher inlet. The ball 116g cannot then be displaced. The balls 116g and 116h act as check valves preventing backflow from outlet 116m.

From the control-pressure transmitter 6, and output line 18 extends to a junction of a pair of branch lines 19 and 20; line 19 communicates with one input side of another changeover valve 21 while line 20 communicates with an input side of a fourth changeover valve 22.

The output line 23 from control-pressure transmitter 7 is branched into lines 24 and 25. Line 24 communicates with the opposite input side of the first-mentioned changeover valve 16 while line 25 communicates with the other input side of the third changeover valve 21 also described previously.

Correspondingly, the control-pressure transmitter 8 has an output line 26 which is branched into two lines 27 and 28. Branch 27 communicates with the other input side of the second changeover valve 17 while branch 28 communicates with the opposite side of the fourth changeover valve 22.

All four control-pressure transmitters 5, 6, 7, and 8 are supplied with hydraulic fluid from a common pump 29 via a line 30. The pressureless return to the reservoir 32 from each of these valves 5–8 is effected by a line 31.

As previously indicated, the four control-pressure valves 5–8 are actuated by a common control member 3, 4 and form therewith a control device which is outlined in dot dash lines and is represented at 33.

From the changeover valve 16, the output line 34 communicates with a line 35 extending through an auxiliary valve 65 which will be described in greater detail hereinafter and supplies the pressurizable compartment 36 on one side of a piston 37 of the servomotor controlling the variable-displacement pump of the hydrostatic transmission on the left side of the vehicle.

In order to better understand the drive system, it should be noted that the vehicle may have a prime mover, e.g. an internal-combustion engine or an electric motor. The output shaft of this motor is connected to the pump 29 supplying the control pressure and to each of a pair of pumps (not illustrated) forming part of respective hydrostatic transmissions of the axial-piston pump/axial-piston motor type the motor shafts are connected to the drive wheels or tracks on the left- and right-hand side of the vehicles respectively. The pumps of these hydrostatic transmissions have control elements which are swingable from neutral positions in which the pump is free-wheeling and does not displace the respective motor, to positions on either side in which fluid is forced from the pump to drive the respective motor in one or another direction. Depending upon the degree to which the control element of the pump is displaced, the motor will be driven at a greater or lesser speed in the respective direction. The control member of the pump is displaced by the servomotor such as the piston 37. A corresponding piston 42 is provided to control the variable displacement pump at the right-hand side of the vehicle. The hydrostatic transmissions may be of the type described in *Fluid Power*, U.S. Government Printing Office, Washington, D.C., 1966, pages 199ff.

When the compartment 36 is pressurized the piston 37 is displaced in the direction of arrow 1 and its motor is driven to propel the left-hand side drive wheel or track of the vehicle in the forward direction. The piston 37 is biased into its central or neutral position in which its motor is not driven, by a pair of oppositely effective springs 38.

Correspondingly, an ouput line 39 extends from the changeover valves 17 to the pressurizable compartment 41 of another servomotor containing the piston 42 previously mentioned, line 40 likewise extending through the valve 65 to be described below. The piston 42 is also biased into its neutral position by a pair of springs 38 and when shifted in the direction of arrow 1 by the pressure delivered from line 40, operates the right-hand drive wheel or track of the vehicle in the forward direction.

Although the operation of the device will be described in greater detail below, it should be observed at the present time that a displacement of plunger 9 inwardly will cause hydraulic fluid to flow under pressure from pump 29 via line 30 through the transmitter 5 and line 13 to each of the two branches 14 and 15 at equal pressures. If it is assumed that lines 27 and 24 are pressureless, the changeover valves 16 and 17 will operate to connect line 14 and 15 respectively to lines 34 and 39 which, as noted, deliver fluid under pressure to compartments 36 and 41 of the respective servomotors to displace the respective pistons 37 and 42 in the direction of arrow 1 to the same degree and therefore cause the motors of the two hydrostatic transmissions to propel the vehicle in straight-line forward motion.

The output of changeover valve 21 is connected via a line 43 to the opposite pressurizable compartment 45 of the piston 37. Thus the pressure in compartment 45 acts opposite to the pressure in compartment 36. Similarly, changeover valve 22 is connected via line 47 and line 48 to the pressurizable compartment 49 on the opposite side of piston 42.

As previously noted, the line 25 from control-pressure transmitter 7 extends to one of the input sides of the changeover valve 21. When the pressure in line 25 is higher than that in line 19, the changeover valve 21 connects line 25 with line 43 and line 44 to pressurize compartment 45 of the servomotor at the left-hand side of the vehicle.

If it is assumed that the vehicle is in a forward drive mode, the chamber 36 is at an elevated pressure and the forward speed of the vehicle is increased as the pressure in chamber 36 is increased, the piston 37 being moved correspondingly in the direction of arrow 1 against the upper spring 38. Now a pressure is generated in line 44 and compartment 45; this is effective against the pressure in compartment 36 and acts together with the upper spring 38 to urge the piston 37 back toward a neutral position, i.e. in the direction of reduced vehicle speed.

Correspondingly, line 28 from the right-hand transmitter 8 is connected via line 46 to the changeover valve 22. When line 46 experiences a higher pressure than that prevailing in line 20, the changeover valve 22 connects line 46 with line 47 which communicates via line 48 with the compartment 49 above the piston 52. The piston is then biased by the pressure in compartment 49 to a reduced-speed position just as has been described for the left-hand servomotor.

The hydrostatic transmissions of the present system also have variable-stroke hydrostatic motors, i.e. the stroke of the pistons of the axial piston motors can also be varied. To this end, the left-hand hydrostatic transmission has another servomotor represented by piston 50 connected to the control element of the left-hand hydrostatic motor. This piston 50 is displaceable in a cylinder 51. Correspondingly, the right-hand hydrostatic motor has its control element displaceable by the servomotor piston 60 in a cylinder 61.

The pistons 50 and 62, therefore, are servomotors for setting the stroke of the variable-stroke hydrostatic motors of the hydrostatic transmissions at the left- and right-hand sides of the vehicle respectively. The piston 50 operates against the force of a spring 52 while the piston 62 operates against the force of a correspondingly numbered spring.

The output line 34 of changeover valve 16 is also branched to a line 53 which extends to one of the inputs of a fifth changeover valve 54. The other input side of this changeover valve 16 is connected to the line 43 previously mentioned while the output side of changeover valve 54 is connected via line 55 to a pressurizable compartment 56 in cylinder 51 acting upon the piston 50 opposite the spring 52. When line 43 has a higher pressure than line 53, line 43 will be connected to line 55 through the changeover valve 54 so that the pressure in line 43 will prevail in compartment 56. Conversely, when line 53 has the higher pressure, it will be connected via the changeover valve 54 to line 55 and thence to the compartment 56.

Thus, depending upon which of lines 43 or 53 has the higher pressure, the corresponding line will be connected via the changeover valve 54 with the line 55 to the compartment 56. When the compartment 56 is pressureless, the spring 52 biases it into its extreme right-hand position as illustrated in FIG. 1. In this position the left-hand hydrostatic motor has its greatest stroke volume per revolution. When the compartment 56 is pressurized with the prevailing pressure in line 55, the piston 50 is shifted to the left against the force of spring 52 to displace the hydrostatic motor into a smaller stroke volume per revolution made.

Correspondingly, the output line 59 from changeover valve 17 is branched to a line 57 which is connected to one of the input sides of a sixth changeover valve 58.

Line 47 from changeover valve 52 is connected to the other input side of the changeover valve 58. The output side of this changeover valve 58 communicates via lines 59 with a compartment 60 on the left-hand side of the piston 52 so that, when compartment 60 is supplied with fluid under pressure, the piston 62 will be displaced against the force of spring 52 to the right.

Thus, as described for the left-hand servomotor, 51, when the pressure in line 39, 57 is higher than the pressure in line 47, line 57 will be connected to lines 39 and compartment 60. Conversely, when the pressure in line 47 exceeds that in line 57, line 47 will be connected via line 59 to the compartment 60. Depending upon which pressure is higher in line 47 or line 57, the respective line will be connected via the changeover valve 58 to the line 59 and to the compartment 60 of the cylinder 61. The piston 62 is thereby shifted against the force of spring 52 to the right in the direction of lower speed of the right-hand hydrostatic motor.

Line 28 is extended also to the right-hand compartment 63 of the cylinder 61 so that it acts upon the piston 62 so that the pressure in this line acts upon the cylinder 62 opposite the pressure in chamber 60. The pressure in chamber 63 together with the force of spring 52 urged the piston 62 to the left against the pressure in chamber 60 as noted. Correspondingly, line 25 is extended to the pressurizable compartment 64 on the left-hand side of the piston 50 within cylinder 51.

As previously noted, as auxiliary valve 65 is provided in lines 35 and 40. Valve 65 is a four-port, two-position valve, as illustrated, also known as a 4/2 distributing valve. In its normal position shown in FIG. 1, line 35 is connected with compartment 36 so that the left-hand changeover valves 16, 54 and 21 operate upon the piston 37 as will be apparent in greater detail hereinafter and as has been alluded to earlier. Correspondingly, line 40 and the changeover valves 17, 58 and 22 operate upon the piston 42 of the right-hand servomotor.

When valve 65 is, however, switched over to its other position, line 40 is connected to compartment 36 and line 35 from changeover valve 16 and line 34, is connected to compartment 41.

OPERATION

For straight-line forward drive, the control member 3 is swung forwardly in the plane $x$ and depresses the plunger 9 of the control-pressure transmitter 5. As a result a pressure is generated in line 13 which is proportional to the forward displacement of the lever 3. This pressure is applied via line 14 and 15 to the changeover valves 16 and 17. Since the control-pressure transmitters 7 and 8 are inoperative, lines 24 and 27 are pressureless. Accordingly, the pressure in lines 14 and 15 dominates in changeover valves 16 and 17. The pressure of line 13 is thereby communicated to lines 34 and 39. This pressure is applied via lines 35 and 40. in the normal position of valve 65 to compartments 36 and 41 of the pistons 37 and 42 to displace both of them equally in the direction of arrow 1. Both transmissions are thereby driven in the forward direction at the same rate.

The pressure in line 53 is applied to the changeover valve 54 to which the line 43 is also connected. Line 43, however, extends from changeover valve 21. As noted, line 25 is pressureless so that the right-hand input of changeover valve 21 has no pressure. Since the transmitter 6 is also inoperative, there is no pressure in line 19 and therefore no pressure in line 43. The pressure in line 53, which is the same as that in lines 13, 14, 34 and 35, thus is applied through the changeover valve 54 to the line 55 and to the compartment 56. This pressure acts to displace the piston 50 to the left against spring 52 whereby the motor is set in the direction of the smallest stroke volume per revolution when the pressure is line 55 (and line 13) is sufficiently high.

Correspondingly, the pressure in line 15 is applied via line 39 to line 57, which pressure prevails in the changeover valve 58 and is applied via line 59 to the compartment 60. When this pressure is sufficient to displace the piston 62 against the force of spring 52, the right-hand motor is set at a lower stroke volume per revolution. Accordingly, the pump settings of the hydrostatic transmissions at the right and left side and the motor settings of the hydrostatic transmissions are the same and perfectly straight-line forward travel operation is ensured.

For forward travel with a right-hand curve, the lever 3 is swung into its position shown in FIG. 1 so that, apart from displacing the plunger 9, the lever 3 displaces the plunger 12 of the control-pressure transmitter 8. The forward drive pressure is maintained at line 13 so that the distribution of this pressure applies as described above. However, now a pressure is generated in line 26 which is applied via line 28 and line 46 to the changeover valve 22. Since line 20 is still pressureless in this condition, the pressure in line 46 controls the valve 22 and is applied to line 47. Note that the pressure in line 20 must be nonexistant because it is not possible to simultaneously displace the rear transmitter 6 while transmitter 5 is actuated. The pressure applied to line 47 is transmitted via line 48 to compartment 49 to act upon the piston 42 opposite the pressure in line 41. Since the piston 42 has a position determined by the pressure in line 40 and this pressure is now counteracted by the force of the upper compressed spring as well as the pressure applied to line 39, piston 42 will be displaced toward a more central position so that the pump of the hydrostatic transmission at the right-hand side of the vehicle will have a reduced displacement and the track or wheel on the right-hand vehicle side will be driven more slowly. However, since the piston 37 has not been shifted, the left-hand side continues to be driven at its original rate. Accordingly, a speed differential is established favoring the left-hand side of the vehicle and the vehicle turns to the right while continuing in a forward direction.

Analogously, let us assume that plunger 11 of transmitter 7 is depressed simultaneously with plunger 9. In this case the pressure in line 19 will be nonexistant since transmitter 6 has not been actuated. Accordingly, a pressure is built up in line 23 which is applied to lines 24 and 25. The pressure in line 25 is effective by a changeover valve 21 and is communicated thereby to line 43 and line 44 to the compartment 45 and tends to displace the piston 37 in the direction of arrow 2. Meanwhile, however, the pressure delivered by line 13 remains so that the piston 42 is in its original upper position and the right-hand transmission operates at its usual or previous speed. Accordingly, the speed differential will now favor the right-hand side of the vehicle and the vehicle will enter into a left-hand turn while travelling in the forward direction. When the lever 3 is swung downwardly in the plane $x$, plunger 10 is depressed and the transmitter 6 is actuated. Plunger 9 is now released. A pressure from line 30 is communicated to line 18 and is transmitted to lines 19 and 20 and to the changeover valves 21 and 22. At this time the lateral transmitters 7 and 8 are not actuated. Accordingly, lines 25 and 28 are pressureless. The pressure from lines 19 and 20 is thus applied to lines 43 and 47 via the changeover valves 21 and 22. As a consequence a corresponding pressure is developed in lines 44 and 48 and in the compartments 45 and 49. Compartments 36 and 41 are pressureless since plunger 9 is not depressed. Accordingly, pistons 37 and 42 will be displaced downwardly (arrow 2) to shift the pump control members of the transmissions beyond their neutral positions to their reverse positions and both transmissions will operate to drive the vehicle rearwardly at the same speed and rectilinearly. If this pressure is sufficient, the lines 55 and 49 communicating this pressure to compartments 56 and 60 will result in displacement of pistons 50 and 62 against the springs 52 in the direction of lower stroke volume per revolution for the motors. Both motors will have their stroke varied identically.

Incidentally, it should be noted that springs 52 are predetermined so that a displacement of pistons 50 and 62 will occur only when the pressure applied to compartments 56 and 60 reaches a predetermined level.

For a rearward curve travel of the vehicle, the lever 3 is swung rearwardly and, in addition, laterally out of the longitudinal plane $x$ so that the plunger 11 or the plunger 12 is depressed in addition to plunger 10. Depending upon which of the lateral plungers 11 or 12 is engaged by the lever 3, the corresponding control-pressure transmitter 7 or 8 is energized to cause a corresponding increase in the speed on the right or the left hand side of the vehicle, respectively, to cause the vehicle to turn to the left or to the right while continuing its rearward travel by creating a control-fluid flow path which is analogous to that which obtains in forward travel.

It should be recalled that in either right or left rearward travel, the plunger 10 remains depressed so that its control-pressure transmitter 6 feeds hydraulic pressure via line 18 to lines 19 and 20 and thence via the changeover valve 21 and 22, to the compartments 45 and 49 of the servomotor pistons 37 and 42, to displace these pistons in the direction of arrow 2 representing rearward travel. The servomotors operate upon the pumps of the respective hydrostatic transmissions to swing the control plates thereof through the neutral position into the reverse drive position and operate these pumps with an output which is a function to the degree to which the control member 3 is swung rearwardly.

If, now, the plunger 11 is also depressed for left hand rearward travel, the control-pressure transmitter 7 feeds fluid from pump 29 to line 23 and this control fluid is branched to lines 24 and 25 and applied through changeover valve 16 to compartment 36. As a result piston 37 is shifted in the direction of arrow 1 toward its neutral or lower speed position for rearward direction travel and the left hand hydrostatic transmission operates at a lower output speed than the right hand transmission. The vehicle swings to the left as it continues its rearward movement. The hydrostatic motor of the transmission is controlled via line 25 and compartment 64 in the manner described previously.

Should the member 3 be displaced toward the right rear, plunger 12 is depressed in addition to plunger 10 and fluid is delivered via line 26 to lines 27 and 28. Since the pressure in line 13 is nonexistent, control pressure transmitter 5 being ineffective, changeover valve 17 delivers fluid under pressure to line 39 and thence via line 40 to compartment 41 to displace the piston 42 toward a lower speed position. At the same time this pressure is applied via line 57 and changeover valve 58 to the servomotor 61 when the pressure in line 28 exceeds that in line 47. Otherwise the pressure of line 28 is applied to compartment 63.

When it is desired to rotate the vehicle about its center (rotation in place) to the right, the lever 3 is swung to the right and valve 65 is shifted from the position shown in FIG. 1 to the alternative position of this valve whereby line 35 is connected to compartment 41 and line 40 is connected to compartment 36 of the respective servomotors.

The displacement of the control member 3 to the right pressurized line 26 and hence line 27 and line 39, the lower part of line 40, the upper part of line 35 and compartment 36. The left hand transmission is thus set in a forward-travel mode, the speed being a function of the decrease of displacement of lever 3 to the right.

The corresponding compartment 41 of the servomotor of the hydrostatic transmission of the right hand side of the vehicle is pressureless, being connected to the upper part of line 40 and the lower part of line 35 to the unactuated control-pressure transmitter 7.

However, since the control-pressure transmitter 8 has also pressurized line 28 and this is connected via line 46 to the changeover valve 22, the output line 47 of this changeover valve is pressurized. Note that no counteracting pressure is supplied by line 20. Accordingly, compartment 49 is energized and piston 42 of the right hand servomotor is displaced into a rearward drive mode. The right hand transmission thus has its output in reverse. Since the opposite sides of the vehicle are driven in opposite senses, the vehicle is rotated in place.

Conversely, when the lever 3 is swung to the left and auxiliary valve 65 is switched into the other position from its FIG. 1 position, a drive of the vehicle about its vertical axis in the counterclockwise sense (as seen from the top) will occur.

The 4-port, 2-position valve 65, is here shown to be electrically operated by a switch 65a in series with a battery 65b, the switch forming part of the control station 33 of the vehicle.

The switch 65a may be a contact carried by the control member 3 and engageable with a contact upon a support for this control member when the latter is rotated about its axis. Alternatively the switch 65a can be a pair of contacts which are closed when the head 3a of the control lever is depressed axially.

FIGS. 2 and 3 show details of the mounting of control member 3.

All of the control pressure transmitters 5, 6, 7 and 8 can be formed directly in a common housing 70 which is formed with a threaded bore 70a into which a bushing 70b is screwed. A cap screw 71 is threaded into the bushing 70b and bears with its shoulder 71a against a pair of inwardly extending ledges 72a of a base 72 formed with a slide 72b receiving the head 71b of the cap screw 71.

The support 72 is bifurcated, (see FIG. 3) and has upstanding arms 72c in which a pivot pin 73 is received. Pin 73 defines a horizontal axis lying in the $x$ plane. The arms 72c have flanks 72d which lie parallel to the $y$ plane and extend perpendicularly to the pin 73.

Rocker 74 is swingably mounted upon the pivot 73 for movement in the $y$ plane between the flanks 72d of the arms 72c. Such pivot movement is represented by the arrow in FIG. 2.

In the rocker 74 we have mounted a pair of coaxial pivot bolts 75 (FIG. 2) which are engaged by the bifurcation 76 of a holder 77 into which the lower part of member 3 is threaded. A lock nut 77a prevents inadvertent withdrawal of the control member 3 from the holder 77. The arms 76 of this holder 77 straddle an upstanding plate 78 of the rocker 74, the plate 78 lying in the x plane.

Plate 78 forms both a detent for indexing the control member 3 in its neutral position and a brake plate for restraining displacement of the holder 77 about the pivot axis defined by the pins 75. The latter pivot axis is perpendicular to the axis 73 but coplanar therwith and lies in the y plane.

The brake is also caused by a pair of brake shoes 80 which are carried by unthreaded shanks 79a of bolts 79 which are threaded into holes 76a of the arms 76 confronting the opposite faces 78a and 78b of the plate 78. Belleville washers form dished-disk spring packets 81 which bear against shoulders 79b of the bolts 79 and urge the brake shoes frictionally into engagement with the respective surfaces 78a and 78b of the plate 78.

Each of the brake shoes comprises a metallic support plate 80a which is engaged by the spring packet 81 and a brake lining 80b applied to this plate.

The bolts 79 are formed as headless set screws which can be turned into their respective holes 76a by suitable hexagonal-head keys and can be locked in place by the nuts 79c.

Thus, while the brake shoes bear frictionally against the plate 78, they merely retard free displacement of the lever 3 and its holder 77 about the pivot axis defined by the pin 75.

The upper edge 82 of the brake plate 78 is cylindrical and has a radius R of curvature centered upon the axis A defined by the pin 75. Along the axis B of the control member 3 we provide a ball 84 which is urged in the direction of arrow C by a coil spring 85, this ball being engageable in a V-shaped recess 83 formed in the center of the cylindrical edge 82. Thus in the exact center position of its travel, the control member 3 is indexed against displacement in the x plane to either side.

The coil spring 85 is received within a bore 3b formed in the lower end of the control lever 3. With a predetermined lateral force, however, the ball 84 can be cammed out of the recess 83 to permit swinging of the lever into a forward or after position.

The underside of the fork 76 is provided with a pressure ring 86 which is an upwardly divergent frustoconical configuration (see FIGS. 2 and 3). The frustoconical lower side 82 of this ring bears upon the curved tips of the plungers 9, 10, 11 and 12 of the control pressure transmitters 5, 6, 7 and 8. The play between the plungers and the surface 87 can be adjusted by raising or lowering the plungers via nuts 9a, 10a, 11a and 12a respectively.

In FIG. 4 we have shown another mode of adjustment for the play between lower surface 87 of the ring 86 and the plungers. In this case, each of the plungers has a pressure head 88 with a stem 88a threaded into the plungers and locked thereagainst by a nut 89. The heads 88 are conical and bear against the surface 87.

The system of FIGS. 2 through 4, of course, operate in the manner described previously. For example, when a forward displacement of the vehicle is required, the control member 3 is shifted in the plane x to the left (FIG. 3) about the axis A in the counterclockwise sense, the ball 84 being cammed out of the notch 83 to allow this displacement. Of course, involuntary movement of the control member 3 to the left or to the right is prevented by the brake shoes 80 which bear upon the plate 78. The control member 3 is thus held in any position in which it is set until it is returned to its central or neutral position in which the ball 84 reengages the notch 83. A displacement of the vehicle in a rearward direction is effected by swinging movement of the control member 3 about axis A in the clockwise sense.

The lever 3 can also be swung about the pivot 73 in the counterclockwise sense to actuate plunger 11. If ball 84 is lodged in its notch 83, such displacement merely operates the left hand control pressure transmitter as described and may be accomplished by an actuation of valve 65. Upon release of the control member 3, the storing force on the plunger 11 will suffice to bias the rocker 74 in the counterclockwise sense until the surface 87 engages the plunger 12. Thus, until the control member is displaced to the left or to the right, out of the plane x, it will be invariably returned to this plane upon its release so that a continued left hand or right hand turning movement will not be experienced although the vehicle will continue in its forward or rearward direction. A displacement of the control member 3 in the clockwise sense as seen in FIG. 2 operates plunger 12 and control-pressure transmitter 8.

Finally, when the ball 84 is released from its notch 83 and the lever is shifted to either side of plane x, there is a combined forward and lateral movement which results in turning of the vehicle in the corresponding direction of travel.

We claim:

1. In a differential-speed steering system for an automotive vehicle in which opposite sides of the vehicle are driven by respective hydrostatic transmissions each having a servomechanism shiftable from a neutral position to forward-drive and reverse-drive positions, four control-pressure transmitters are provided for actuation by a common control member, and the control-pressure transmitters are connected to said servomechanisms, said control member having a neutral position in which all four control-pressure transmitters are unaffected, said control-pressure transmitters being disposed symmetrically about said control member, the improvement wherein:

said control-pressure transmitters are disposed opposite one another in pairs including a first pair lying in a plane parallel to the longitudinal direction of the vehicle and a second pair lying in a plane transverse to said first plane;

said servomechanisms each include a servomotor having a piston defining a pair of oppositely effective pressurizable compartments adapted to be charged with fluid to displace the piston in a respective direction;

correspondingly effective compartments of both said servomotors are connected to a respective one of the control-pressure transmitters of said first pair for simultaneous pressurization of said correspondingly effective compartments, and each of the control-pressure transmitters of said second pair is connected to the compartment opposite that energized by a transmitter of said first pair on the corresponding side of said vehicle to reduce the output speed of the hydrostatic transmission on said corresponding side of said vehicle to enable differential speed turning thereof.

2. A differential-speed steering system for a hydraulically powered automotive vehicle in which opposite sides of the vehicle have variable-speed reversible hydrostatic transmissions, comprising:

a respective servomotor connected to each of said hydrostatic transmissions and including a piston defining a pair of oppositely effective compartments, the compartments of each servomotor including a first compartment pressuriable to displace the respective piston in a direction operating the respective transmission in a forward-drive direction, and a second compartment pressurizable to operate the respective transmission in a reverse-drive direction;

a control member;

a pair of first control-pressure transmitters disposed on opposite sides of said control member in a plane parallel to the longitudinal direction of the vehicle;

a pair of second control-pressure transmitters disposed in a plane perpendicular to said longitudinal direction and arrayed on opposite sides of said control member, said transmitters being disposed symmetrically about said control member for actuation thereby upon displacement of said control member in corresponding directions from a central position wherein all of said transmitters are unaffected, one only of said second transmitters being actuated upon a lateral displacement of said control member to either side of a longitudinal plane through said first transmitters and one only of said first transmitters being actuated upon a displacement of said control member in the longitudinal direction from said central position;

first, second, third and fourth changeover valves each having a pair of inputs and an output communicating with the input to which the higher fluid pressure is applied;

first duct means connecting each of said first transmitters to respective first inputs of both said first and said second changeover valves and both said third and fourth changeover valves respectively;

second duct means connecting said second transmitters to the other inputs of both said first and third and both said second and fourth changeover valves respectively;

first conduit means connecting each output of said first and said second changeover valves to a respective one of said first compartments; and second conduit means connecting each output of said third and fourth changeover valves to the corresponding second compartment of the respective servomotor.

3. The steering system defined in claim 2 wherein said hydrostatic transmissions each have a variable-displacement pump having a displacement-regulating element connected to the respective piston.

4. The steering system defined in claim 3 wherein each of said hydrostatic transmissions further includes a variable-displacement hydrostatic motor, said system further comprising:

a respective servomotor connected to the displacement-controlling element of each of said hydrostatic motors and provided with a motor-controlling piston biased by a spring in one direction;

fifth and sixth changeover valves each having a pair of inputs and an output communicating with its input at which the higher pressure is applied;

third conduit means connecting the outputs of said first and third changeover valves with respective inputs of said fifth changeover valves;

fourth conduit means connecting respective outputs of said second and fourth changeover valves with respective inputs of said sixth changeover valves; and fifth conduit means connecting the outputs of said fifth and sixth changeover valves with respective compartments of said motor-controlling pistons for pressurization thereof in directions opposite the effects of the respective springs thereon.

5. The steering system defined in claim 2 wherein said first duct means includes an auxiliary valve selectively operable independently of the transmitters for reversing the connections between said first compartments and the outputs of said first and second changeover valves.

6. The steering system defined in claim 2 wherein said second transmitters have spring-loaded plungers resisting displacement by said control member to a greater extent than spring-loaded plungers formed on said first transmitters.

7. The steering system defined in claim 2, further comprising prestressed springs acting upon said control member in a direction opposite the lateral displacement thereof.

8. The steering system defined in claim 2 wherein said control member is formed with an actuating plate and said transmitters have plungers engageable by said plate for the actuation of the transmitters, said system further comprising means for adjusting the play between said plungers and said plate.

9. The steering system defined in claim 2 wherein said control member is a rod, said system further comprising:

a mount defining a first pivot axis lying in said plane parallel to the longitudinal direction of said vehicle;

a rocker swingable on said mount about said axis;

pivot means on said rocker defining a second pivot axis perpendicular to said first axis and lying in said plane perpendicular to said longitudinal direction; and an actuating member engaged by said rod and swingable on said pivot means, said actuating member being juxtaposed with said transmitters for engagement therewith.

10. The steering system defined in claim 9, further comprising a brake plate on said rocker in said plane parallel to said longitudinal direction; and a pair of brakeshoes on said actuating member frictionally engaging said brake plate.

11. The steering system defined in claim 10, further comprising detent means on said brake plate and said actuating member for indexing said rod in a central position with respect to swinging movement about said second pivot axis.

12. The steering system defined in claim 11 wherein said detent means includes a notch formed in a cylindrical edge of said brake plate and a spring-loaded member engageable in said notch and carried on said actuating member.

13. The steering system defined in claim 12 wherein said spring-loaded member is a ball received in said rod and said actuating member is bifurcated and has legs straddling said plate.

14. The steering system defined in claim 13, further comprising a ring on said legs forming an annular frustoconical surface engageable with respective plungers of said control-pressure transmitters.

15. A system for mounting a control member to enable it to actuate four control-pressure transmitters in the hydraulic system of a vehicle having a longitudinal plane, said system comprising:
- a mount defining a first pivot axis lying in a plane parallel to a longitudinal direction of said vehicle;
- a rocker swingable on said mount about said first axis;
- pivot means on said rocker defining a second pivot axis perpendicular to said first axis and lying in a plane perpendicular to said longitudinal direction;
- an actuating member engaged by said rod and swingable on said pivot means, said actuating member being juxtaposed with said transmitters for engagement therewith;
- brake means restricting displacement of said actuating member about said second axis relative to said rocker, said brake means comprising:
  - a brake plate on said rocker in said plane parallel to said longitudinal direction, and
  - a pair of brakeshoes on said actuating member frictionally engaging said brake plate; and
- detent means on said brake plate and said actuating member for indexing said rod in a central position with respect to swinging movement about said second pivot axis, said detent means including a notch formed in a cylindrical edge of said brake plate and a spring-loaded member engageable in said notch and carried on said actuating member, said spring-loaded member being a ball received in said rod and said actuating member being bifurcated and having legs straddling said plate.

16. The system defined in claim 15, further comprising a ring on said legs forming an annular frustoconical surface engageable with respective plungers of said control-pressure transmitters.

* * * * *